United States Patent Office 3,595,840
Patented July 27, 1971

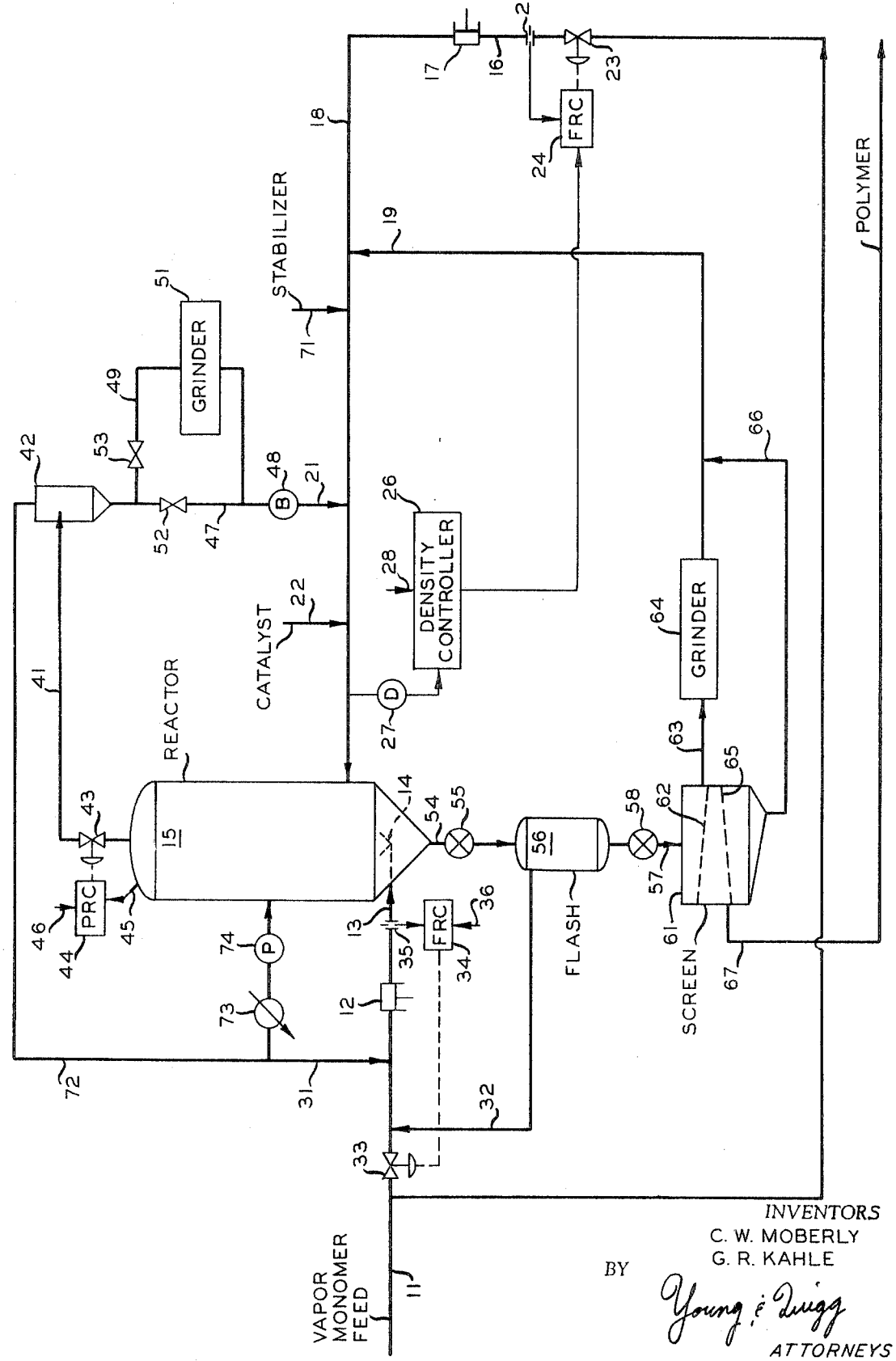

3,595,840
CONTROL OF PARTICLE SIZE IN VINYL
MONOMER POLYMERIZATION
Charles W. Moberly and Gerald R. Kahle, Bartlesville,
Okla., assignors to Phillips Petroleum Company
Filed Nov. 25, 1968, Ser. No. 778,709
Int. Cl. C08f 1/00, 3/00, 3/30
U.S. Cl. 260—78.4                               8 Claims

ABSTRACT OF THE DISCLOSURE

A portion of the polymer particles withdrawn from a vapor phase polymerization reactor are ground to produce seed polymer particles which are then impregnated with a catalyst and reintroduced into the polymerization reactor. The portion to be ground can be the particles having a particle size greater than a desired value which are obtained by screening the reactor effluent. Polymer particles below a minimum size can also be returned to the reactor. Stabilizers can be added to the reactor to improve the properties of the polymer.

This invention relates to a method and apparatus for the polymerization of vinyl monomers, alone or with suitable comonomers under bulk conditions, that is, in the absence of any substantial amount of solvents or diluents. Considerable difficulties have been encountered in the bulk polymerization of vinyl monomers, such as vinyl chloride, in the liquid phase. One system which avoids many of these difficulties utilizes a liquid phase agitated reactor and a gas fluidized bed reactor in series. In such a system it is often desirable to utilize the liquid phase reactor to produce seed polymer which acts as a solid support for any catalyst remaining from the first reactor and additional catalyst introduced into the fluidized bed reactor. However, the utilization of two reactors increases the capital cost of the installation as well as greatly increasing the complexity of the operation. Furthermore, the use of a single stage fluidized bed reactor permits the seed particles to be instantaneously admixed with the entire reaction mixture in the fluidized bed reactor. However, this results in a portion of the seed polymer particles being prematurely withdrawn as a portion of the reaction effluent. Not only does this reduce the yield, but the presence of the small size seed particles gives a wider particle size range to the product than is desired. The fluidized bed also permits the growth of polymer particles which are larger than desired. While these difficulties can be reduced by the use of a multiple stage fluidized bed reactor, the particle size range can still be greater than desirable.

Accordingly, it is an object of the invention to provide a bulk polymerization system for vinyl type monomers which requires only a single type of reactor. It is also an object of the invention to provide a fluidized bed polymerization system for vinyl type monomers wherein the product polymer particle size can be maintained within desired limits.

Other objects, aspects and advantages of the invention will be apparent from a study of the specification, the drawing and the appended claims to the invention.

In accordance with the invention the reaction effluent from a fluidized bed reactor for the polymerization of vinyl type monomers is screened to remove polymer particles having undesirable particle size. The particles which are too large are passed to a grinder to produce new seed polymer. Particles which are smaller than the desired minimum product particle size can be returned to the reactor directly or admixed with the new seed polymer particles for impregnation with catalyst. The catalyst impregnated seed particles are then returned to the reactor. Stabilizers can be added to the reactor to improve the properties of the polymer product.

Referring now to the drawing, there is illustrated a schematic representation of a fluidized bed polymerization system in accordance with the present invention.

Monomers which can be polymerized alone or copolymerized together in accordance with the process of the invention include monomers having the structure:

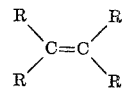

where each R is selected from the group consisting of hydrogen, halogen, furyl, pyridinyl, carboazolyl, alkyl, aryl, alkaryl, aralkyl, alkenyl, alkynyl, halogen substituted aryl, halogen substituted alkyl, halogen substituted aralkyl, halogen substituted alkaryl, halogen substituted alkenyl, halogen substituted alkynyl, alkoxy substituted aryl, alkoxy substituted alkaryl, alkoxy substituted alkenyl, alkoxy substituted alkynyl, alkoxy substituted alkyl, alkenylaryl,
—COOR′, —CONR$_2$′, —C≡N, —COR′, —OR′
and R′COO—, where R′ is selected from the group consisting of hydrogen, alkyl, aryl, alkaryl and aralkyl, not more than three R's being hydrogen and the number of carbon atoms in each R being less than 21.

Some examples of monomers which can be polymerized alone or copolymerized together in accordance with the invention include conjugated dienes such as butadiene (1,3-butadiene), 2,3-dimethyl-1,3-butadiene, isoprene, piperylene, 2-furyl-1,3-butadiene, 2-methoxy-1,3-butadiene, and the like; haloprenes, such as chloroprene (2-chloro-1,3 - butadiene), bromoprene, 2-ethoxy - 1,3 - butadiene, methylchloroprene (2-chloro-3-methyl-1,2-butadiene), and the like; aryl substituted olefins such as styrene; various alkyl styrenes such as o-ethylstyrene, m-tetradecylstyrene, and the like; p-chlorostyrene, p-vinylstyrene, m-methoxy-p-isopropylstyrene, o-chloro-p-decylstyrene, 3 - bromo-4-vinylbutyne - 1, p-methoxystyrene, alpha - methylstyrene, vinylnaphthalene, 4 - butoxy - 5 - vinylpentyne-1, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, heptadecyl methacrylate, phenyl acrylate, o-tolyl methacrylate, benzyl ethacrylate, acrylonitrile, methacrylonitrile, methacrylamide, N,N-diphenylacrylamide, N,N - di - o - tolylacrylamide, and the like; methyl isopropenyl ketone, methyl vinyl ketone; 1-naphthyl vinyl ketone, methyl vinyl ether, 2-anthryl vinyl ether, vinyl acetate, vinyl formate, vinyl arachidate, vinyl chloride, vinyl fluoride, vinylidene chloride, vinylidene fluoride, vinylene chloride, vinylene fluoride, 1,2-dichloro-1-propene, bromotrichloroethylene, bromotrifluoroethylene, chlorotrifluoroethylene, tetrafluoroethylene, dichlorodifluoroethylene, vinylidene cyanide, dimethylfumarate, diethylmaleate, ethylcrotonate, N-phenyl-maleamic acid, vinylfurane, vinylpyridine, vinylcarbazole, vinylacetylene and other unsaturated hydrocarbons, esters, alcohols, acids, ethers, etc., of the types described.

The terms "impregnate," "impregnation," and the like, as used herein shall be understood to mean addition of catalyst to polymer particles by any means known to the industry, such as by spraying, dipping, and the like.

The monomer is passed from feed conduit 11 through compressor 12 and conduit 13 to distributor 14 located in the bottom portion of fluidized bed reactor 15. A portion of the monomer from conduit 11 is passed through conduit 16 and compressor 17 to conduit 18. Seed polymer is introduced into conduit 18 by way of conduits 19 and 21. Catalyst is introduced into conduit 18 by way of conduit 22 to impregnate the seed polymer particles. The catalyst impregnated seed polymer particles are then introduced into the lower portion of reactor 15 at a point above distributor 14. While any known catalyst for the polymerization of vinyl type monomers can be utilized, the present preferred catalyst is a free radical precursor.

One group of compounds which are suitable is the hexahalogen ethanes which are characterized by the following structure:

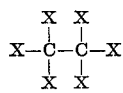

wherein each X is halogen selected from the group consisting of fluorine, chlorine, bromine, and iodine.

Another group of compounds which is suitable for use as free radical precursors are peroxides having the structure:

wherein each R is selected from the group consisting of hydrogen, alkyl, cycloalkyl, aryl, alkaryl, aralkyl, alkylcycloalkyl, and cycloalkylalkyl radicals containing from 1 to 15 carbon atoms, optionally halogen substituted; X and Y are selected from the group consisting of

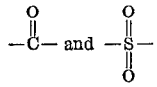

and each of $n$ and $m$ is 0 or 1.

The dialkyl peroxydicarbonates, represented by the formula:

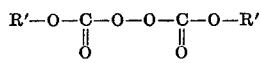

wherein each R' is selected from the group consisting of alkyl, cycloalkyl, aryl, alkaryl, aralkyl, alkylcycloalkyl, alkenyl, cycloalkenyl, alkylcycloalkenyl, and cycloalkylalkenyl radicals containing from 1 to 20 carbon atoms, optionally halogen substituted, have been found to be particularly useful, with diisopropyl peroxydicarbonate being presently preferred because of its reactivity. Preparation of a number of peroxydicarbonates is described in U.S. Pats. 2,370,588 and 2,464,062, which are incorporated herein by reference.

Specific examples of the various classes mentioned previously include hexachloroethane, 1,1,1-tribromo-2,2,2-trichloroethane, 1,1-dichloro-1,2,2,2-tetrafluoroethane 1,1,1,2,2-pentafluoro-2-iodoethane, dimethyl peroxide, methyl ethyl peroxide, dicyclohexyl peroxide, diphenyl peroxide, bis(alpha, alpha-diisopropyl-4-ethylbenzyl) peroxide, 4-cyclohexylphenyl hydroperoxide, isobutyryl peroxide, acetyl cyclohexane sulfonyl peroxide, 2,4-dichlorobenzoyl peroxide, t-butyl peroxypivalate, di(2-ethylhexyl) peroxydicarbonate, di(sec-butyl) peroxydicarbonate, di(t-butylcyclohexyl) peroxydicarbonate, diisopropyl peroxydicarbonate, and the like.

Other free radical precursors that can be used include the azo compounds of U.S. Pats. 2,471,959 and 2,520,338, the azoamidine compounds of U.S. 2,599,300, and cyclic amidine compounds such as azobis-N,N'-methyleneisobutyramide monoacetate, azobis-N,N'-dimethyleneisobutyramidine dihydrochloride, diazoaminobenzene, and the like.

In fact, any known free radical precursor, many of which are known to the industry, can be utilized. Suitable additional free radical precursors are listed, for example, in the Faraday Society Symposium on Free Radicals, London, 1953, and in the Book Free Radicals by Ingram, Academic Press, Inc., New York, 1958.

The rate of flow of monomer through conduit 16 is regulated by valve 23 which is manipulated by flow recorder controller 24 responsive to a comparison of the actual flow rate as indicated by flow sensor 25 and the desired flow rate represented by the output of density controller 26 which is applied to the setpoint input of controller 24. A densitometer 27, for example a gamma ray density unit, measures the density of the mixture of seed polymer particles and monomer in conduit 18 downstream of conduit 21 and applies a signal representative of the measurement to the measurement input of controller 26. The setpoint input 28 of controller 26 represents the desired density value. In general, this density will be in the range corresponding to about 5 weight percent polymer particles to about 50 weight percent polymer particles. The desired density will vary with the monomer, the size of the seed polymer particles, the desired transfer rate of seed polymer through conduit 18 and the amount of monomer required to transport the seed polymer particles.

Recycled monomer is introduced by way of conduits 31 and 32 into conduit 11 downstream of valve 33. Valve 33 is manipulated by flow recorder controller 34 responsive to a comparison of the actual flow rate through conduit 13 as indicated by flow sensor 35 and the desired flow rate represented by setpoint input 36. The rate of flow through conduit 13 is sufficient to provide an upward flow of fluidizing gas in reactor 15 in the range of about 0.1 foot per second to about 0.4 foot per second depending upon the desired particle size of the polymer. Where the flow rate of monomer through conduit 16 is sufficient, the output of flow sensors 25 and 35 can be added and the composite signal applied to the measurement input of controller 34. The pressure and temperature in reactor 15 will generally be in the range of about 60 p.s.i.a to about 175 p.s.i.a and about 100° F. to about 165° F., respectively.

A gaseous monomer stream, containing entrained polymer fines, is passed by way of conduit 41 from the overhead portion of reactor 15 into cyclone separator 42. Valve 43, located in conduit 41, is manipulated by pressure recorder controller 44 responsive to a comparison of the actual pressure in the overhead of reactor 15 as indicated by pressure sensor 45 and the desired pressure represented by setpoint 46. Solid particles withdrawn from separator 42 can be passed through conduit 47, blower 48 and conduit 21 into conduit 18. Where the solid particles in separator 42 have a size greater than desired, all or a portion can be passed through conduit 49 and a grinder 51 to blower 48. Valves 52 and 53, located in conduits 47 and 49, respectively, can be manipulated to vary the portion of the solids passing through the respective conduits. The gaseous monomer from the overhead of separator 42 is recycled through conduit 31 to feed conduit 11. Heavier polymer particles are withdrawn from the bottom of reactor 15 by way of conduit 54 and star valve 55 and are introduced into flash tank 56 which is operated at a sufficiently low pressure to free unreacted monomer. The gaseous monomer is withdrawn from flash tank 56 and passed by way of conduit 32 to feed conduit 11. The denuded polymer particles pass from the bottom of flash tank 56 through conduit 57 and star valve 58 into screen chamber 61. The screen chamber 61 can be provided with an upper, large mesh screen 62 to retain only the polymer particles having a size greater than the maximum desired particle size while passing all smaller polymer particles. The large size polymer particles are withdrawn by way of overflow conduit 63 and passed into grinder 64 wherein the large particles are ground into small seed polymer particles. The polymer fines, which have a particle size less than the minimum desired product size, pass through a second small mesh screen 65 and are withdrawn from the bottom of screen chamber 61 by way of underflow conduit 66. The polymer particles which have a particle size within the range of the minimum desired product particle size to the maximum desired product particle size are withdrawn from screen chamber 61 by way of intermediate conduit 67 and passed to storage or further processing as desired. The fines from conduit 66 and the effluent of grinder 64 are combined and passed through conduit 19 into the gaseous monomer stream in conduit 18.

Where desired a condenser can be utilized in conduit 18 upstream of conduit 19 to liquefy the monomer to provide a slurry of seed polymer particles in liquid monomer. A valve can be positioned in conduit 18 adjacent the outlet thereof into reactor 15 to maintain the upstream pressure in conduit 18 necessary to maintain the liquid slurry. Screen 62 will have a mesh size depending on the desired maximum product particle size and will generally be in the range of 10 mesh to 100 mesh (Tyler), corresponding to a maximum particle size of 0.065 inch to 0.0058 inch. Similarly, screen 65 will be selected in accordance with the minimum desired product particle size and will generally be in the range of 200 mesh to 400 mesh (Tyler) corresponding to a minimum desired product particle size of 0.0029 inch to 0.0015 inch. Where the size of some of the particles passing through conduit 66 are greater than the maximum desired seed polymer particle size, conduit 66 can be connected directly to an inlet of grinder 64 instead of conduit 19. The size of the seed polymer from grinders 51 and 64 will generally be in the range of about 100 to about 400 mesh (Tyler).

It has been found desirable to incorporate stabilizer into the polymer during polymerization. This can be done by any suitable procedure, for example one or more stabilizers can be passed through conduit 71 into conduit 18. Suitable stabilizers include alkyl tin fatty acid salts, such as dibutyl tin dilaurate, dibutyltin acetate, dibutyltin malate, dioctyltin dilaurate, and Groups II and IV-A fatty acid and other salts prepared from acids having 10 to 20 carbon atoms in the molecule, such as calcium stearate, zinc stearate, strontium naphthenate, barium oleate, cadmium laurate and their mixtures.

The stabilizers are generally employed in an amount in the range of about 0.5 to about 2 weight percent of the polymer product being withdrawn by way of conduit 67. By incorporating the stabilizers or additives during polymerization, a subsequent blending step is eliminated, a more uniform distribution is produced, and improved properties are obtained. If desired a portion of the monomer vapor recycle from separator 42 can be passed through conduit 72 containing condenser 73 and pump 74 for the purpose of aiding in the regulation of the temperature in reactor 15.

The following example is presented in further illustration of the invention and should not be construed in undue limitation thereof.

EXAMPLE

A fluidized bed reactor is operated at 140° F. and 115 p.s.i.g. for the vapor phase polymerization of vinyl chloride. The charge rates to the reactor are 400 pounds per hour of finely ground poly (vinyl chloride) seed particles and 3.6 pounds per hour of diisopropyl peroxydicarbonate with vinyl chloride charge and circulation to produce 5000 pounds per hour of poly (vinyl chloride) product. The total vinyl chloride charge rate to the fluidized bed is 123,000 pounds per hour of which 35,000 pounds is supplied to the reactor in the form of liquid to counteract the heat formed during polymerization, 2000 pounds per hour is used to transfer the ground seed to the reactor, and the remainder is recirculated through a cyclone and blower for the purpose of fluidizing the polymer particles. From the cyclone is separated 40 pounds per hour of finely divided PVC particles which pass through a 200 mesh sieve. The product from the bottom of the reactor is passed first onto a 60 mesh screen and the particles retained on the 60 mesh screen amounting to about 320 pounds per hour are ground in a micropulverizer until it passes through a 200 mesh screen. The product through the 60 mesh screen is further screened to recover product 200 mesh and finer. The 200 mesh and finer PVC from the cyclone, from the grinding of larger particles and from screening the product are combined and amount to 400 pounds per hour. Vinyl chloride, compressed by a blower in the amount of about 2000 pounds per hour, is used to transfer the ground poly (vinyl chloride) to the reactor. Before entering the reactor it is sprayed in the line with 3.6 pounds per hour of diisopropyl peroxydicarbonate as a 10 percent by weight solution in n-pentane. The initiator solution is maintained at 0° F. to protect it from decomposition prior to use. In addition, 50 pounds per hour of dibutyltin dilaurate which is diluted 50:50 with n-pentane is sprayed onto the ground poly(vinyl chloride) before it enters the reactor. The screened product, having a particle size range of 60 to 200 mesh, is further swept countercurrently with nitrogen at 160° F. to remove vinyl chloride vapor and pentane. The product amounting to 5000 pounds per hour and containing about one percent dibutyltin dilaurate is stored for bagging and for further processing into blends.

While particle size separator 61 has been illustrated in terms of sizing screens, any other means for separating according to particle size can be utilized.

Reasonable variations and modifications are possible within the foregoing disclosure, the drawing and the appended claims to the invention.

We claim:

1. A process for producing a polymer by polymerizing at least one monomer having the structure

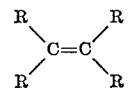

where each R is selected from the group consisting of hydrogen, halogen, furyl, pyridinyl, carbazolyl, alkyl, aryl, alkaryl, aralkyl, alkenyl, alkynyl, halogen substituted aryl, halogen substituted alkyl, halogen substituted aralkyl, halogen substituted alkaryl, halogen substituted alkenyl, halogen substituted alkynyl, alkoxy substituted aryl, alkoxy substituted alkaryl, alkoxy substituted alkenyl, alkoxy substituted alkynyl, alkoxy substituted alkyl, alkenylaryl, —COOR′, —CONR$_2$′, —C≡N, COR′, —OR′, and R′COO— where R′ is selected from the group consisting of hydrogen, alkyl, aryl, alkaryl and aralkyl, not more than one R being hydrogen and the number of carbon atoms in each R being less than 21, which comprises grinding particles of said polymer in a grinding zone to produce seed polymer particles; passing the thus produced seed polymer particles, said at least one monomer and a free radical catalyst into a vapor phase fluidized bed polymerization zone; withdrawing gaseous monomer from an upper portion of said fluidized bed polymerization zone and returning the thus withdrawn gaseous monomer to a lower portion of said fluidized bed polymerization zone to serve as a fluidizing gas; withdrawing polymer particles from said fluidized bed polymerization zone; passing at least a portion of the polymer particles withdrawn from said fluidized bed polymerization zone to a sizing zone; withdrawing particles having the largest particle sizes from said sizing zone and passing the thus withdrawn particles having the largest sizes to an inlet of said grinding zone; and withdrawing from said sizing zone as a product at least a portion of the remaining particles.

2. A process in accordance with claim 1 wherein at least a portion of the polymer particles withdrawn from said fluidized bed polymerization zone and passed to said sizing zone is withdrawn from a lower portion of said fluidized bed polymerization zone.

3. A process in accordance with claim 2 wherein particles having the smallest particle sizes are withdrawn from said sizing zone and returned to said fluidized bed polymerization zone, and particles having a size intermediate said smallest sizes and said largest sizes are withdrawn from said sizing zone as product.

4. A process in accordance with claim 3 wherein at least a portion of said particles having the smallest particle sizes are returned to said fluidized bed polymerization zone after being subjected to grinding in said grinding zone.

5. A process in accordance with claim 4 wherein the largest particle size in said product is in the range of about 10 mesh to about 100 mesh, the smallest particle size in said product is in the range of about 200 mesh to about 400 mesh, and said seed polymer particles have a size in the range of about 100 mesh to about 400 mesh.

6. A process in accordance with claim 1 wherein the polymer particles withdrawn from said lower portion of said fluidized bed polymerization zone are passed to a flash zone prior to introduction into said sizing zone, to recover at least a portion of the gaseous monomer associated therewith, and further comprising returning the thus recovered gaseous monomer from said flash zone to said fluidized bed polymerization zone.

7. A process in accordance with claim 1 wherein at least a portion of said monomer feed to said fluidized bed polymerization zone is utilized to transport said seed polymer particles from said grinding zone to said fluidized bed polymerization zone.

8. A process in accordance with claim 7 wherein said portion of the monomer feed is varied to maintain the concentration of polymer particles in the combined stream of polymer particles and transporting monomer feed within a desired range, and the remainder of said monomer feed is introduced directly into said fluidized bed polymerization zone.

References Cited

UNITED STATES PATENTS

| | | | |
|---|---|---|---|
| 2,460,546 | 2/1949 | Stephanoff | 260—95 |
| 2,715,117 | 8/1955 | Baeyaert | 260—92.8 |
| 2,961,432 | 11/1960 | Fikentscher et al. | 260—87.1 |

JOSEPH L. SCHOFER, Primary Examiner

J. KIGHT III, Assistant Examiner

U.S. Cl. X.R.

260—45.85, 62, 78.4. 78.5, 80, 80.3, 80.6, 82.1, 82.3, 83.1, 83.5, 83.7, 84.7, 85.3, 85.5, 85.7, 86.1, 86.3, 86.7, 87.1, 87.3, 87.5, 87.7, 88.1, 88.2, 88.3, 88.5, 88.7, 89.1, 89.3, 89.5, 89.7, 91.1, 91.3, 91.5, 91.7, 92.1, 92.3, 93.1, 93.3, 93.7, 94.1, 94.2, 94.6, 94.8, 94.9, 95